United States Patent Office 3,808,215
Patented Apr. 30, 1974

3,808,215
N ALKOXYL NAPHTHALIMIDES
Otto Christmann, Frankenthal, and Horst Scheuermann, Ludwigshafen, Germany, assignors to Badische Anilin- & Soda-Fabrik Aktiengesellschaft, Ludwigshafen (Rhine), Germany
No Drawing. Filed Mar. 20, 1972, Ser. No. 236,211
Claims priority, application Germany, Mar. 26, 1971, P 21 14 634.9
Int. Cl. C07d 39/00
U.S. Cl. 260—281                             2 Claims

ABSTRACT OF THE DISCLOSURE

Disperse dyes of the thioxanthene series of the formula:

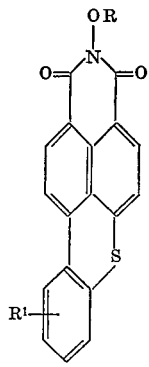

where R is a hydrocarbon radical, and $R^1$ is hydrogen, chloro, methyl, methoxy, cyano, carbomethoxy or acetoxy. They give brilliant yellow dyeings of good fastness properties, particularly on polyesters.

---

The invention relates to dyes of the General Formula I:

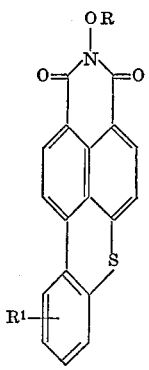

in which R is an unsubstituted or substituted alkyl, cycloalkyl, aralkyl, aryl or heterocyclic radical and $R^1$ is hydrogen, chlorine, methyl, methoxy, cyano, carbomethoxy or acetoxy.

Examples of alkyl radicals R are linear or branched groups of up to eight carbon atoms which may bear, as substituents, cyano, chloro, bromo, hydroxy, alkoxy, carbalkoxy, alkoxycarbonyloxy, alkylaminocarbonyloxy, arylaminocarbonyloxy, amoyl, N-substituted carbamoyl, amino, dialkylamino or monocyclic heterocycle. Cycloalkyl radicals R may bear alkyl as substituent, aralkyl radicals R may bear as substituents the radicals specified for alkyl and also for example sulfonamido. Heterocyclic radicals R include nitrogenous monocyclic unsaturated five-membered or six-membered rings.

Specific examples of R are: methyl, ethyl, n-propyl, isopropyl, n-butyl, isobutyl, tert.-butyl, n-hexyl, β-ethylhexyl, β-hydroxyethyl, β-methoxyethyl, β-ethoxyethyl, β-butoxyethyl, β-methoxypropyl, γ-methoxypropyl, β-ethoxyethoxyethyl, cyanomethyl, β-chloroethyl, β-bromoethyl, β-cyanoethyl, γ-cyanopropyl, β-carbomethoxyethyl, β-carboethoxyethyl, β-carbobutoxyethyl, β-carboxamidoethyl, carbomethoxymethyl, carboethoxymethyl, carbo-β-ethylhexoxymethyl, β-aminoethyl, γ-dimethylaminopropyl, carbo-(β-methoxyethoxy)-methyl, carbo-(β-ethoxyethoxy)-methyl, carbo-(β-butoxyethoxy)-methyl, β-carbo-(β-hydroxyethoxy)-ethyl, $C_2H_4CO(OC_2H_4)_2OH$, $C_2H_4CO(COC_2H_4)_2OCH_3$, $C_2H_4CO(OC_2H_4)_2OC_4H_9$, γ-diethylaminopropyl or β-(N,N-dimethylcarboxamido)ethyl and the radicals of the formulae:

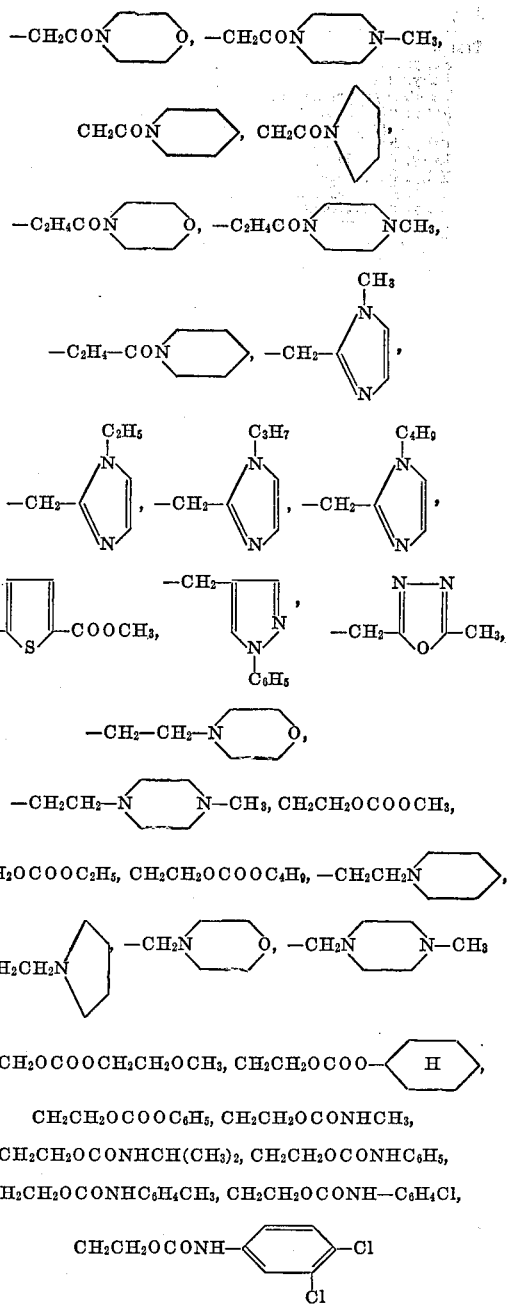

or the equivalent radicals in which the group

—CH₂—CH₂— is replaced by

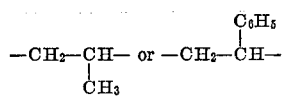

Further examples are: cyclohexyl, methylcyclohexyl, cyclooctyl, benzyl, β-phenylethyl, p-chlorobenzyl, p-methylbenzyl, p-methoxybenzyl, p-carbomethoxybenzyl, p-carboethoxybenzyl, β-carbobutoxybenzyl, β-ethylhexoxybenzyl, p-cyanobenzyl, 2,4-dimethylbenzyl, 2-methyl-5-carbomethoxybenzyl, p-carboxyamidobenzyl, p-carbodimethylamidobenzyl, p-carbodiethylamidobenzyl, p-carbodibutylamidobenzyl, p - dimethylaminobenzyl, p - diethylaminobenzyl, p-sulfonamidobenzyl and the radicals of the formulae:

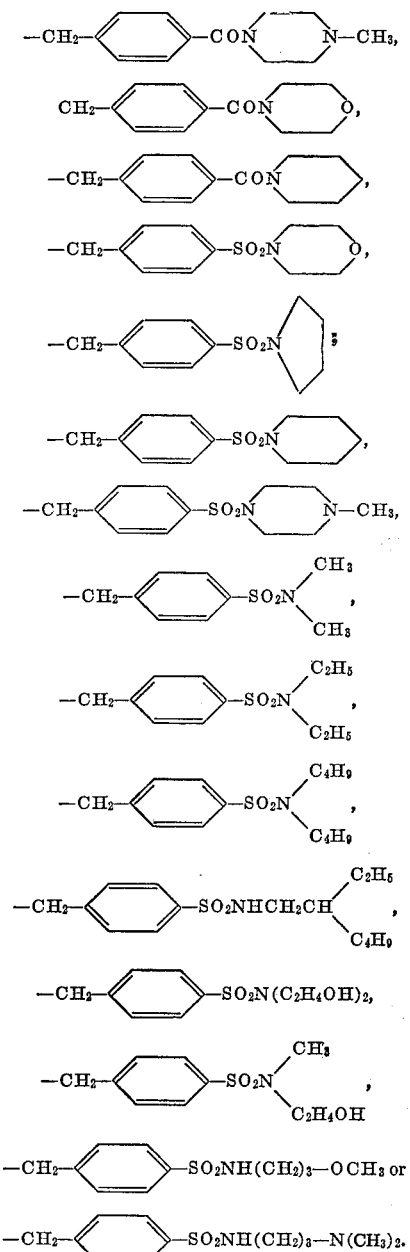

Examples of aryl radicals R are:

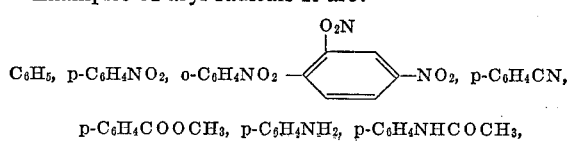

p-C₆H₄NH—COC₆H₁₃ or p-C₆H₄NHCO—C₆H₅.

Heterocyclic radicals R have the general formula:

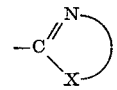

in which X is a divalent radical which makes up the ring to a five-membered or six-membered ring. The following are specific examples of R:

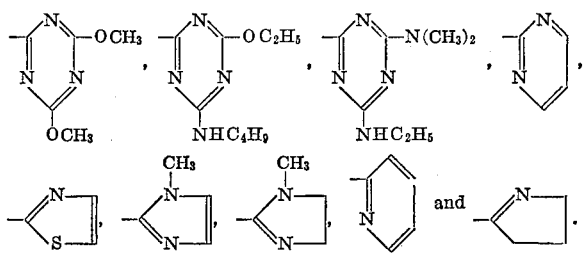

The new dyes are yellow to red and of high brilliance. They are suitable for dyeing textile material of polyamides, acrylonitrile polymers, cellulose esters and particularly synthetic polyesters such as polyethylene glycol terephthalate. Another important application is coloring plastics such as polyvinyl chloride, polyvinylidene chloride, polyethylene, polypropylene or polystyrene in bright yellow to orange shades and improving the brilliance of plastics which have already been provided with a yellow pigment.

The dyes may be incorporated into the plastics for example in finely divided form or as a solution in a plasticizer by a conventional method, for example by kneading.

Specifically the procedure for the production of dyes having the Formula I may be as follows:

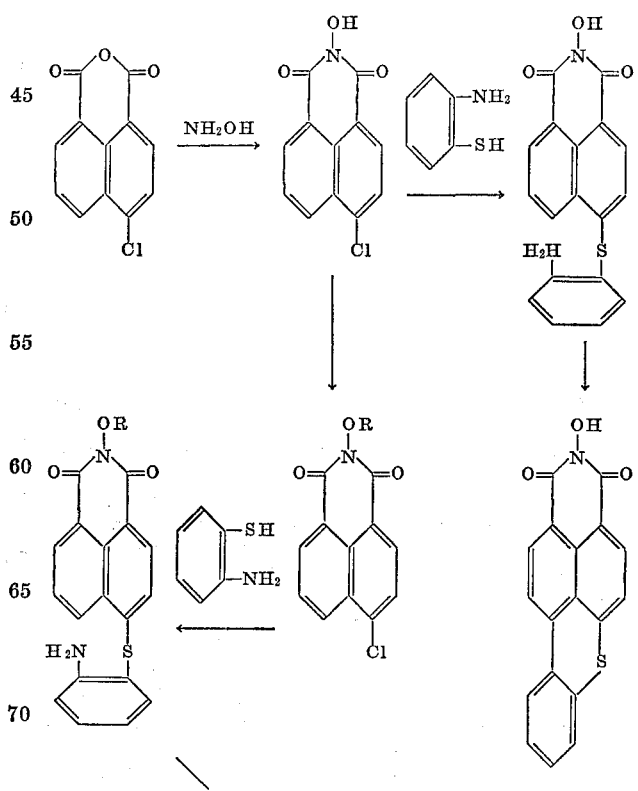

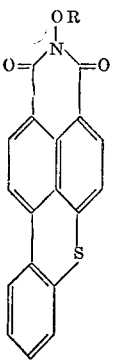

(1)

The reactions are known in principle and proceed analogously under comparable conditions.

Compounds of the Formula I are of special industrial importance when $R^1$ is hydrogen and R is alkyl or arkyl substituted by the said radicals. The substituents may be particularly hydroxy, alkoxy of one to four carbon atoms, cyano, carbalkoxy of a total of two to nine carbon atoms and among these esters of glycol or alkoxycarbonyloxy, alkylaminocarbonyloxy, phenylaminocarbonyloxy or phenylaminocarbonyloxy bearing chloro or methyl as a substituent. Preferred radicals R from among the said groups are unsubstituted linear or branched alkyl radicals of one to eight carbon atoms.

Dyes of the formula:

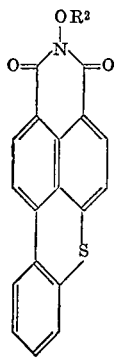

in which $R^2$ is alkyl of one to eight carbon atoms, hydroxyalkyl of two to six carbon atoms, cyanoethyl, carbalkoxyethyl of a total of four to seven carbon atoms, alkoxyethoxyethyl of one to four carbon atoms in the alkoxy radical, alkoxycarbonyloxyalkyl of one to four carbon atoms in the alkoxy radical and two or three carbon atoms in the alkyl radical, alkylaminocarbonyloxyalkyl of one to four carbon atoms in the alkyl radicals or phenylaminocarbonyloxyalkyl of two or three carbon atoms in the alkyl radical which may bear methyl or chlorine as substituents are of particular interest.

The following examples illustrate the invention. Parts and percentages are by weight unless otherwise stated.

EXAMPLE 1

15.0 parts of concentrated hydrochloric acid is allowed to flow at 85° to 90° C. into a solution of 18.2 parts of N-ethoxy-4-(2′-aminophenylmercapto)-naphthalimide in 250 parts of glacial acetic acid. The hydrochloride formed is cooled to 0° C. and is diazotized by adding a solution of 3.5 parts of sodium nitrite in 11.7 parts of water at 0° to 5° C. over fifteen minutes. The diazo solution is stirred for another two hours at 0° to 5° C. and then stirred over thirty minutes into a boiling solution of 37.0 parts of copper sulfate in 600.0 parts of water. The whole is boiled under reflux for two hours, suction filtered while hot, washed with hot water until free from salt and dried at 80° C. 15.9 parts (i.e. 91.7% of theory) of the compound of the formula:

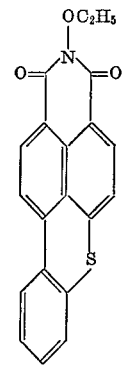

is obtained. It melts at 260° to 261° C.

The N-ethoxy-4-(2′-aminophenylmercapto)-naphthalimide required as starting compound is prepared as follows:

A suspension consisting of 150 parts of butanol, 27.55 parts of N-ethoxy-4-chloronaphthalimide, 15 parts of 2-aminothiophenol and 20.8 parts of anhydrous potassium carbonate is heated to refluxing temperature. Four hours later the reaction mixture is stirred into for example about 1000 parts by volume of petroleum ether or methanol. The yellow precipitate is suction filtered, washed twice or three times with a little methanol and then with water and dried.

33.7 parts (92.7% of theory) of N-ethoxy-4-(2′-aminophenylmercapto)-naphthalimide is obtained having a melting point of 277° to 278° C.

EXAMPLE 2

7 parts of N-butoxy-4-(2′-aminophenylmercapto-naphthalimide is dissolved in 90 parts of glacial acetic acid at 80° C. 4.3 parts of concentrated hydrochloric acid is added at 80° C. and the whole is then cooled to 0° to 5° C. Diazotization is carried out by dripping in a solution of 1.3 parts of sodium nitrite in 15 parts of water at 0° to 5° C. The diazo solution is stirred for another one hour to two hours at 0° to 5° C. and then dripped over one hour into a boiilng solution of 15 parts of $CuSO_4.5H_2O$ and 220 parts of water. The whole is stirred for another hour under reflux, suction filtered while hot, the residue washed with hot water and dried at 100° C. 5.6 parts (83.5% of theory) of the compound of the formula:

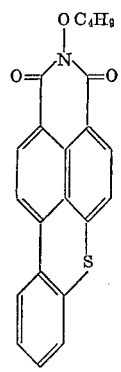

is obtained. The compound melts at 207° to 208° C.

EXAMPLE 3

17.5 parts of N-methoxy-4-(2'-aminophenylmercapto)-naphthalimide in 150 parts of glacial acetic acid is diazotized by the method described in Example 1 and cyclized.

13.6 parts (81.8% of theory) of the compound of the formula:

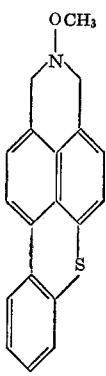

is obtained. It melts at 307° to 309° C.

EXAMPLE 4

15 parts of concentrated hydrochloric acid is added at 80° C. to 20.4 parts of N-carbomethoxymethoxy-4-(2'-aminophenylmercapto)-naphthalimide in 200 parts of glacial acetic acid. The whole is cooled to 0° C. Diazotization is carried out at 0° to 5° C. over fifteen minutes by dripping in 35 parts of a 10% solution of sodium nitrite. The whole is stirred for another two hours at 0° to 5° C. and the diazo solution is allow to drip over one hour into a boiling solution of 37 parts of crystallized copper sulfate and 500 parts of water. After another hour at refluxing temperature, hot suction filtration is carried out and the filter cake is washed with water and dried. 17.6 parts (92.5% of the theory) of the compound having the formula:

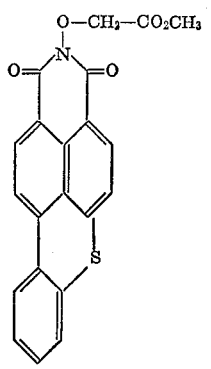

is obtained. It melts at 285° to 287° C.

EXAMPLE 5

15 parts of concentrated hydrochloric acid is added at 80° to 85° C. to a mixture of 22.46 parts of N-β-morpholinoethoxy - 4 - (2'-aminophenylmercapto)-naphthalimide and 150 parts of glacial acetic acid and stirring continued for another fifteen minutes. The hydrochloride thus obtained is diluted with 100 parts of water and cooled to 0° C. A solution of 3.5 parts of sodium nitrite in 11.7 parts of water is then dripped in over five minutes. The whole is stirred for one hour to complete the diazotization. The diazo compound is decomposed by dripping it into a boiling solution of 40 parts of copper sulfate in 700 parts of water. The whole is stirred for one hour at refluxing temperature, the suspension is poured into about 1000 parts of water and a pH of 9 to 10 is set up with concentrated ammonia solution. The whole is suction filtered while hot, washed with hot water and dried at 90° C.

13.1 parts (60.2% of theory) of the compound of the formula:

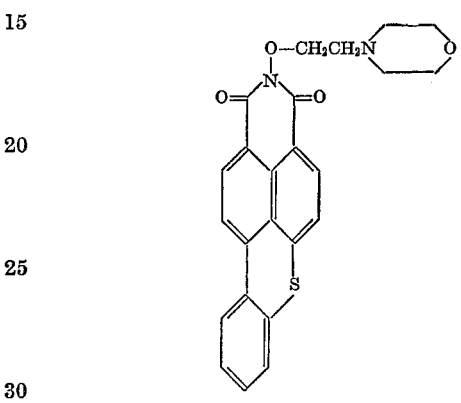

is obtained. It melts at 118° to 121° C.

EXAMPLE 6

15 parts of concentrated hydrochloric acid is added at 85° C. to a suspension consisting of 24.5 parts of N-(5 - carbomethoxy)-phenyl - (2')-methoxy-4-(2''-aminophenylmercapto)-naphthalimide and 150 parts of glacial acetic acid. Thirty minutes later the whole is cooled to 0° C. to 5° C. and diazotization is carried out at this temperature by adding 35 parts of a 10% solution of sodium nitrite. Decomposition of the diazonium salt solution and working up the same are carried out as described in Example 1. 20.3 parts (85.8% of theory) of the compound of the formula:

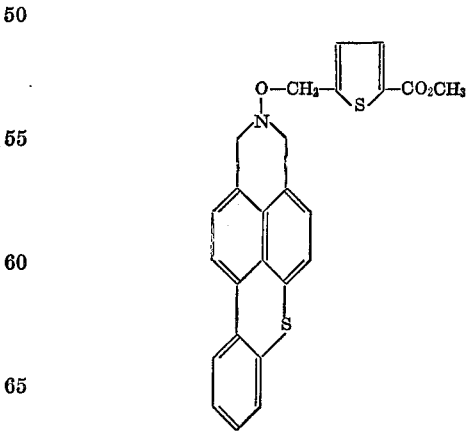

is obtained. The compound melts at 190° to 195° C.

EXAMPLE 7

21.5 parts of N-(1'-methylimidazolyl-2')-methoxy-4-(2''-aminophenylmercapto)-naphthalimide is suspended in 200 parts of glacial acetic acid and converted into the hydrochloride by adding 15 parts of concentrated hydrochloric acid at 70° C. The solution is diluted with 50 parts of water and diazotized by dripping in a solution of 3.5 parts of sodium nitrite in 20 parts of water. After diazotization is completed, the diazo solution is dripped into a boiling solution of 37 parts of copper sulfate in 500 parts of water and the whole is stirred for one hour at refluxing temperature. The suspension is diluted with another 500 parts of water, made alkaline with concentrated ammonia solution and suction filtered. The residue is washed with cold water and dried.

17 parts (82.5% of theory) of the compound of the formula:

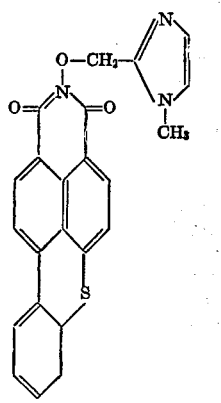

is obtained. It melts at 252° to 253° C.

EXAMPLE 8

The procedure of Example 1 is followed but 21.3 parts of N-benzyloxy - 4 - (2' - aminophenylmercapto)naphthalimide is used instead of the N-ethoxy compound. 14.7 parts (72% of theory) of the compound of the formula:

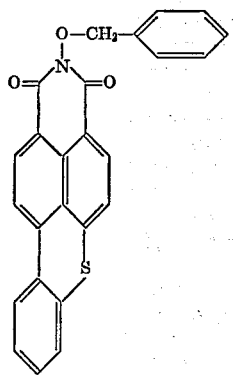

is obtained. It melts at 268° to 271° C.

EXAMPLE 9

247.5 parts of N-hydroxy - 4 - chloronaphthalimide, 150 parts of 2-aminothiophenol and 138 parts of anhydrous potassium carbonate are suspended in 2000 parts of butanol. The suspension is heated to refluxing temperature and stirred until the reaction is over. After the reaction is completed the whole is cooled to room temperature, suction filtered when cold and the residue is washed first with methanol and then with water. After having been dried at 80° C., 286 parts (78.2% of theory) of N-hydroxy - 4-(2'-aminophenylmercapto)-naphthalimide is obtained having the melting point 275° C.

12 parts of N - hydroxy-4-(2'-aminophenylmercapto)-naphthalimide is heated to 85° to 90° C. in 180 parts of glacial acetic acid and 8.6 parts of concentrated hydrochloric acid is added. The hydrochloric acid thus obtained is cooled to 0° to 5° C. and diazotized by dripping in a solution consisting of 2.6 parts of sodium nitrite and 20 parts of water. The whole is stirred for another two hours at 0° to 5° C. and then the diazo solution is stirred into a boiling solution of 30 parts of copper sulfate in 400 parts of water over one hour. One hour later the whole is suction filtered while hot and the residue is washed with hot water and dried at 100° C. 8.7 parts (76.3% of theory) of the compound of the formula:

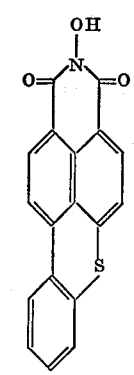

is obtained which melts at 304° to 307° C.

11.3 parts of this compound is dissolved in 50 parts of methanol and 12.7 parts of triethylamine at refluxing temperature and filtered while hot. 14.8 parts of isopropyl bromide is added to the filtrate and the whole is stirred for six hours under reflux. After the reaction is over the methanol is distilled off. The residue is dissolved in 100 parts of dimethylformamide and the dye is separated by stirring the solution into 1000 parts of water. After the residue has been suction filtered and washed with water it is dried at 80° C. 10.1 parts (79% of theory) of the dye of the constitution:

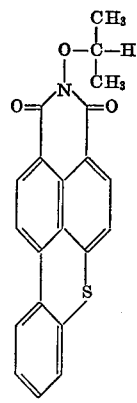

is obtained which melts at 188° to 190° C.

The dyes characterized by reference to their substituents in the following table may be obtained by methods analogous to those described in the examples.

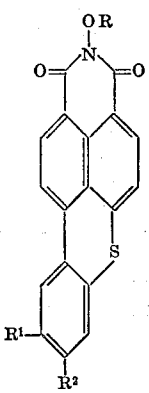

| Example | R | R¹ | R² |
|---|---|---|---|
| 10 | i-C$_3$H$_7$ | H | H |
| 11 | n-C$_6$H$_{13}$ | H | H |
| 12 | CH$_2$CH$_2$OCH$_3$ | H | H |
| 13 | CH$_2$CH(OCH$_3$)—CH$_3$ | H | H |
| 14 | CH$_2$CN | H | H |
| 15 | CH$_2$—CH(C$_2$H$_5$)(C$_4$H$_9$) | H | H |
| 16 | CH$_2$CH$_2$OC$_4$H$_9$ | H | H |
| 17 | (CH$_2$)$_3$OCH$_3$ | H | H |
| 18 | CH$_2$CH$_2$OCH$_2$CH$_2$OC$_2$H$_5$ | H | H |
| 19 | CH$_2$CH$_2$Cl | H | H |
| 20 | CH$_2$CH$_2$CN | H | H |
| 21 | CH$_2$CH$_2$CO$_2$CH$_3$ | H | H |
| 22 | CH$_2$CH$_2$CO$_2$C$_4$H$_9$ | H | H |
| 23 | CH$_2$CH$_2$CONH$_2$ | H | H |
| 24 | CH$_2$CO$_2$C$_2$H$_5$ | H | H |
| 25 | CH$_2$CO$_2$CH$_2$CH(C$_2$H$_5$)(C$_4$H$_9$) | H | H |
| 26 | (CH$_2$)$_3$N(CH$_3$)(CH$_3$) | H | H |
| 27 | CH$_2$CO$_2$CH$_2$CH$_2$OCH$_3$ | H | H |
| 28 | CH$_2$CO$_2$CH$_2$CH$_2$OC$_4$H$_9$ | H | H |
| 29 | CH$_2$CH$_2$OH | H | H |
| 30 | CH$_2$CH$_2$CO$_2$CH$_2$CH$_2$OCH$_2$CH$_2$OH | H | H |
| 31 | CH$_2$CH$_2$CO(OCH$_2$CH$_2$)$_2$OCH$_3$ | H | H |
| 32 | CH$_2$CH$_2$CO(OCH$_2$CH$_2$)$_2$OC$_4$H$_9$ | H | H |
| 33 | CH$_2$CH$_2$CH$_2$N(C$_2$H$_5$)$_2$ | H | H |
| 34 | CH$_2$CH$_2$CH$_2$N(C$_4$H$_9$)$_2$ | H | H |
| 35 | CH$_2$CH$_2$CON(CH$_3$)$_2$ | H | H |
| 36 | | H | H |
| 37 | CH$_2$CON(morpholino) | H | H |
| 38 | CH$_2$CON(piperazino-NCH$_3$) | H | H |
| 39 | CH$_2$CH$_2$CON(piperazino-NCH$_3$) | H | H |
| 40 | CH$_2$-(2,5-dimethyl-1,3,4-oxadiazolyl) | H | H |
| 41 | CH$_2$CH$_2$N(piperazino-N-CH$_3$) | H | H |
| 42 | CH$_2$CH$_2$N(pyrrolidino) | H | H |
| 43 | CH$_2$N(morpholino) | H | H |
| 44 | cyclohexyl | H | H |

TABLE—Continued

| Example | R | R¹ | R² |
|---|---|---|---|
| 45 | CH₂CH₂—C₆H₅ | H | H |
| 46 | CH₂—C₆H₄—OCH₃ | H | H |
| 47 | CH₂—C₆H₄—Cl | H | H |
| 48 | CH₂—C₆H₄—CN | H | H |
| 49 | CH₂—C₆H₄—CH₂CH₃ | H | H |
| 50 | CH₂—C₆H₄—CN (meta) | H | H |
| 51 | CH₂—C₆H₄—CONH₂ | H | H |
| 52 | CH₂—C₆H₄—CON(CH₃)₂ | H | H |
| 53 | CH₂—C₆H₄—N(C₂H₅)₂ | H | H |
| 54 | CH₂—C₆H₄—SO₂NH₂ | H | H |
| 55 | CH₂—C₆H₄—CON(morpholino) | H | H |
| 56 | CH₂—C₆H₄—CON(N-methylpiperazino) | H | H |
| 57 | CH₂—C₆H₄—SO₂N(morpholino) | H | H |
| 58 | CH₂—C₆H₄—SO₂N(C₂H₅)₂ | H | H |
| 59 | CH₂—C₆H₄—SO₂N(CH₂CH₂OH)₂ | H | H |
| 60 | CH₂—C₆H₄—SO₂NH(CH₂)₂OCH₃ | H | H |
| 61 | C₆H₅ | H | H |
| 62 | C₆H₄CN(p) | H | H |
| 63 | C₆H₄CO₂CH₃(p) | H | H |
| 64 | C₆H₄NH₂(p) | H | H |
| 65 | C₆H₄NHCOCH₃(p) | H | H |
| 66 | C₆H₄NHCOC₆H₅(p) | H | H |
| 67 | 2-methoxy-4-methyl-1,3,5-triazin-6-yl | H | H |
| 68 | 1-methylimidazol-2-yl | H | H |
| 69 | 2-pyridyl | H | H |
| 70 | 2-thiazolyl | H | H |

TABLE—Continued

| Example | R | R¹ | R² |
|---|---|---|---|
| 71 | (tetrahydropyridine ring) | H | H |
| 72 | (pyrimidine ring) | H | H |
| 73 | (triazine with OC₂H₅ and NHC₄H₉) | H | H |
| 74 | $C_2H_5$ | $CH_3$ | H |
| 75 | $n\text{-}C_4H_9$ | Cl | H |
| 76 | $n\text{-}C_4H_9$ | $OCH_3$ | H |
| 77 | $CH_2\text{—}C_6H_5$ | CN | H |
| 78 | $n\text{-}C_4H_9$ | H | CN |
| 79 | $n\text{-}C_4H_9$ | H | $CO_2CH_3$ |
| 80 | $C_2H_5$ | H | H |
| 81 | $C_2H_5$ | $OCOCH_3$ | H |
| 82 | $CH_2CH_2OH$ | H | H |
| 83 | $CH_2CH_2NH_2$ | H | H |
| 84 | $CH_2CH_2OCOOCH_3$ | H | H |
| 85 | $CH_2CH_2OCOOC_2H_5$ | H | H |
| 86 | $CH_2CH_2OCOOC_4H_9$ | H | H |
| 87 | $CH_2CH_2OCOOC_6H_5$ | H | H |
| 88 | $CH_2CH_2OCOO\text{—}C_6H_{11}$ | H | H |
| 89 | $CH_2CH_2OCONHCH_3$ | H | H |
| 90 | $CH_2CH_2OCONHCH(CH_3)_2$ | H | H |
| 91 | $CH_2CH_2OCONHC_6H_5$ | H | H |
| 92 | $CH_2CH_2OCONHC_6H_4CH_3(m)$ | H | H |
| 93 | $CH_2CH_2OCONHC_6H_4Cl(p)$ | H | H |
| 94 | $CH_2CH_2OCONHC_6H_3Cl_2(3,4)$ | H | H |
| 95 | $CH_2CH(CH_3)\text{—}OCOOCH_3$ | H | H |
| 96 | $CH_2CH(CH_3)\text{—}OCOOC_4H_9$ | H | H |
| 97 | $CH_2CH(CH_3)\text{—}OCOO\text{—}C_6H_{11}$ | H | H |
| 98 | $CH_2CH(CH_3)\text{—}OCONH\text{—}C_6H_4Cl(p)$ | H | H |
| 99 | $CH_2CH(CH_3)\text{—}OCONHC_6H_5$ | H | H |
| 100 | $CH_2CH(C_6H_5)\text{—}OCOOC_2H_5$ | H | H |
| 101 | $CH_2CH(C_6H_5)\text{—}OCONHCH_3$ | H | H |

We claim:

1. A dye of the formula

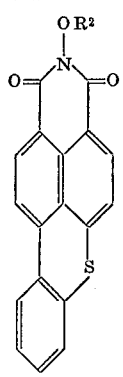

in which R² is alkyl of 1 to 8 carbon atoms, hydroxyethyl carbomethoxymethyl, carboethoxymethyl, carboalkoxyethyl of a total of 4 to 7 carbon atoms, cyanoethyl, morpholinoethyl, benzyl or cyclohexyl.

2. The dye of the formula

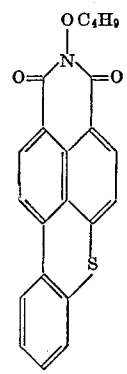

(References on following page)

References Cited

UNITED STATES PATENTS

| | | | |
|---|---|---|---|
| 2,231,495 | 2/1941 | Eckert | 260—281 |
| 3,264,306 | 8/1966 | Paquette | 260—289 R |
| 3,357,985 | 12/1967 | Fuchs et al. | 260—281 |
| 3,367,937 | 2/1968 | Fuchs et al. | 260—281 |
| 3,502,678 | 3/1970 | Fuchs et al. | 260—281 |

DONALD G. DAUS, Primary Examiner

U.S. Cl. X.R.

8—54.7, 177, 178, 179; 260—41 C, 247.1, 268.7 R